United States Patent [19]

Watts

[11] Patent Number: 4,592,429
[45] Date of Patent: Jun. 3, 1986

[54] ROLL-OVER VARIABLE WIDTH PLOW

[76] Inventor: Glen A. Watts, Rte. 3, Box 120, McMinnville, Oreg. 97128

[21] Appl. No.: 573,293

[22] Filed: Jan. 23, 1984

[51] Int. Cl.[4] .......................... A01B 3/30; A01B 69/08
[52] U.S. Cl. .................... 172/212; 172/226; 172/282; 172/647; 172/287
[58] Field of Search ............... 172/647, 285, 291, 283, 172/282, 226, 225, 224, 212, 211, 206, 204, 287; 74/438, 109, 98

[56] References Cited

U.S. PATENT DOCUMENTS

| | | | |
|---|---|---|---|
| Re. 27,850 | 12/1973 | Watts | 172/225 X |
| 2,882,979 | 4/1959 | Chandler et al. | 172/225 |
| 3,174,556 | 3/1965 | Knapp et al. | 172/212 |
| 3,181,890 | 5/1965 | Mellen | 172/226 X |
| 3,481,406 | 12/1969 | Watts | 172/291 X |
| 3,511,317 | 5/1970 | Richey | 172/212 |
| 3,517,750 | 6/1970 | Bell | 172/226 |
| 3,627,058 | 12/1971 | Johannsen | 172/206 |
| 3,817,333 | 6/1974 | Kinzenbaw | 172/285 X |
| 3,910,353 | 10/1975 | Ralston | 172/282 X |
| 4,077,651 | 3/1978 | Steinbach et al. | 172/647 X |
| 4,098,346 | 7/1978 | Stanfill et al. | 172/647 X |
| 4,415,040 | 11/1983 | Salva | 172/647 X |

FOREIGN PATENT DOCUMENTS

| | | |
|---|---|---|
| 2040583 | 2/1971 | Fed. Rep. of Germany . |
| 100036 | 5/1962 | Norway ................................ 74/109 |
| 1319957 | 6/1973 | United Kingdom . |

Primary Examiner—Richard J. Johnson
Assistant Examiner—Terrence L. B. Brown
Attorney, Agent, or Firm—Olson and Olson

[57] ABSTRACT

A two-way gang plow is provided with a pair of front steering wheels muonted for steering adjustment relative to a pivoted front axle. The steering mechanism for the wheels is coupled to a steerable tail wheel through master and slave hydraulic cylinders in such manner that when a towing tractor turns in one direction the master cylinder moves with the turning of the front wheels and supplies hydraulic fluid pressure to the slave cylinder to operate the latter and turn the tail wheel in the direction opposite the turning direction of the front wheels. During roll-over from one operative side to the other, a lever mechanism is operated to turn the axle to correspond with the operative set of plow bottoms. Also, the plow bottoms are mounted pivotally on the plow frames and interconnected by parallel linkages for simultaneous adjustment of the lateral spacing between land sides of adjacent plow bottoms. Linkage between the rear plow pivot and tail wheel support operates to turn the tail wheel to correspond with the pivotal adjustment of the plow bottoms.

8 Claims, 11 Drawing Figures

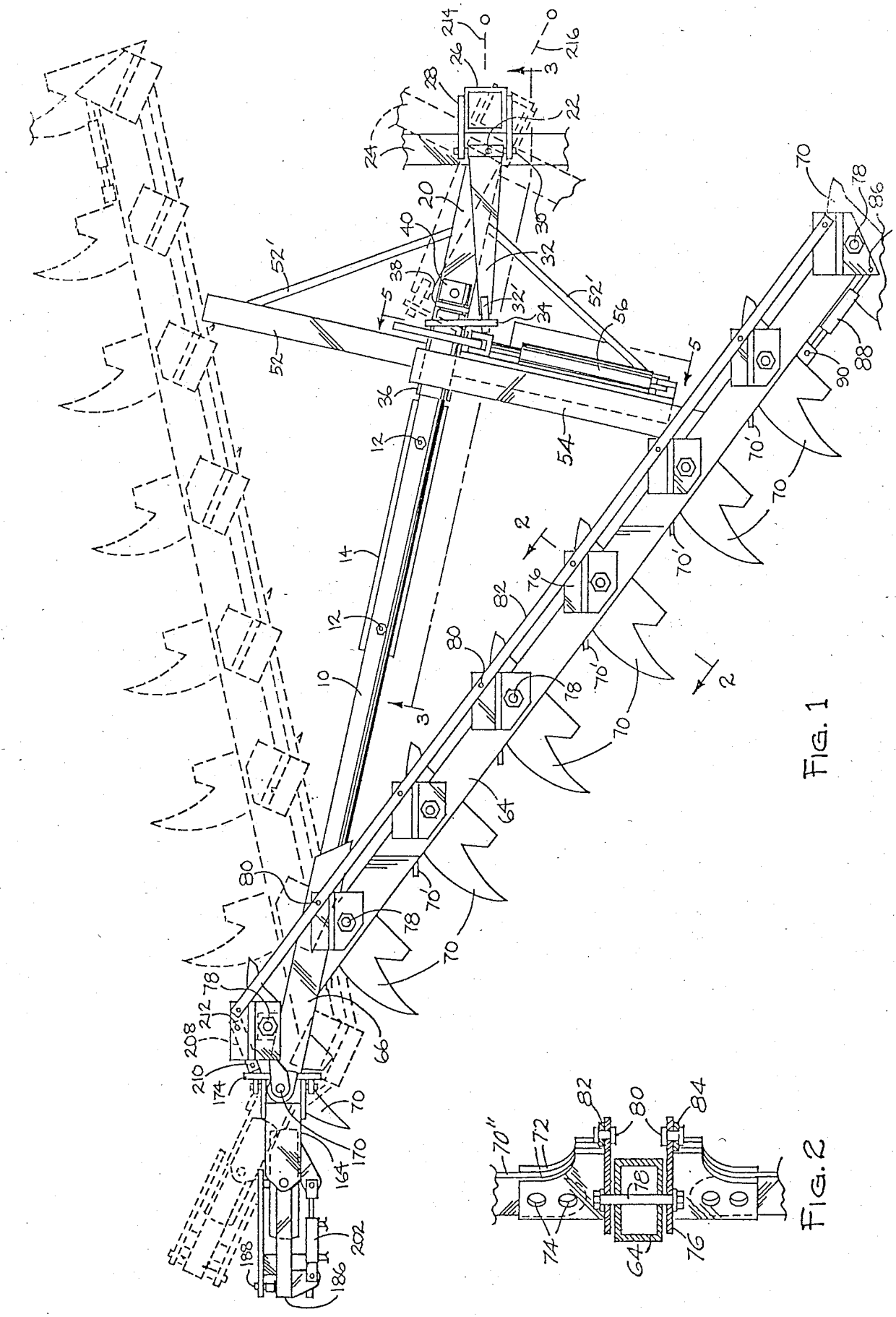

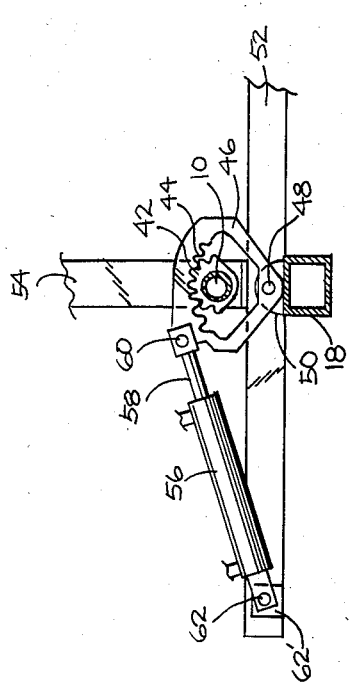
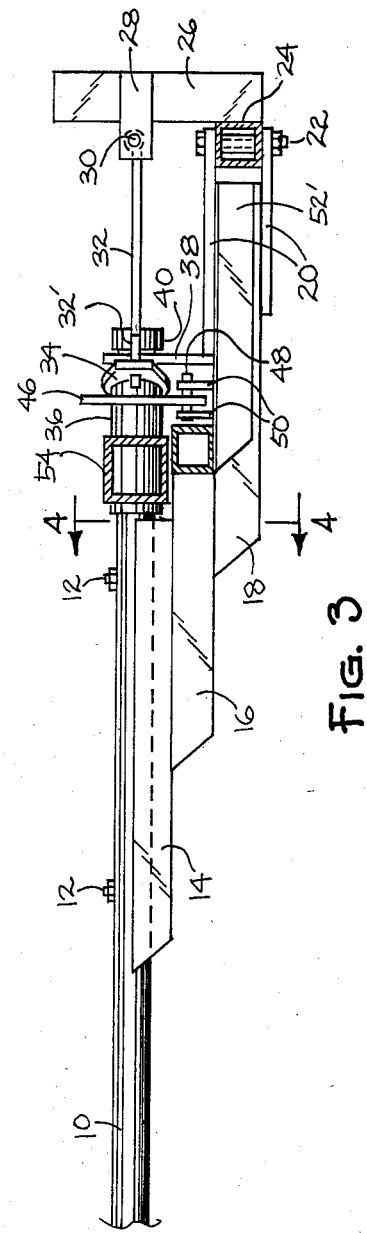
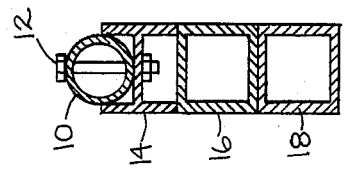

ROLL-OVER VARIABLE WIDTH PLOW

BACKGROUND OF THE INVENTION

This invention relates to plows, and more particularly to two-way gang plows of the type that is supported on front and rear wheels and towed by a tractor.

The only known two-way gang plows of this type are those disclosed in U.S. Pat. Nos. 3,174,556 and 3,196,955. However, neither of these provides steering of the wheels and neither provides adjustment of lateral spacing between the land sides of adjacent plows to accommodate plowing of various types and conditions of soil. For example, with conventional gang plows of the prior art, plowing of compacted or otherwise dense soils requires either the removal of one or more plow bottoms or the use of a more powerful tractor.

Many two-way plows of the prior art provide diverse mechanisms for controlling a steering tail wheel automatically with steering movement of the tractor which supports the front end of the plow. Some, for example, U.S. Pat. No. 3,511,317 utilizes hydraulic cylinders for the purpose, but none employs master and slave hydraulic cylinders in the manner of this invention. Nor does any such prior art plow enable adjustment of the spacing between the land sides of adjacent plow bottoms automatically with steering adjustment of the tail wheel.

The two-way gang plows of the prior art provide various mechanisms for rolling the plow assembly between right and left hand operating positions. Examples of such mechanisms are disclosed in the patents referred to hereinbefore as well as in U.S. Pat. Nos. 3,524,509 and 3,544,294 and German Pat. No. 2,040,583. However, none of them employs the gearing assembly of this invention. Nor does any such prior art plow provide for automatic readjustment of the angular positions of a front wheel axle and tail wheel relative to a plow frame as the plow assembly is changed between right and left and operating positions.

SUMMARY OF THE INVENTION

In its basic concept, the two-way gang plow of this invention operatively interconnects the front supporting pair of steerable wheels, the steerable tail wheel and the plow bottoms to afford simultaneous angular adjustments thereof.

A principal objective of this invention is to provide a two-way gang plow of the class described that overcomes the aforementioned disadvantages and limitations of prior two-way gang plows.

Another object of this invention is to provide a two-way gang plow of the class described in which steering movement of the front wheels causes simultaneous adjustment of the tail wheel.

Still another object of this invention is the provision of a two-way gang plow in which roll-over of the plow assembly is accompanied by simultaneous adjustment of the front wheel axle and the tail wheel support.

A further object of this invention is to provide a two-way gang plow of the class described in which the plow bottoms are adjustable simultaneously to change the lateral spacing between adjacent land sides.

A still further object of this invention is the provision of a two-way gang plow of the class described in which adjustment of the lateral spacing between adjacent land sides of the plow bottoms is accompanied by simultaneous adjustment of the tail wheel support.

A further objective of this invention is the provision of a two-way gang plow of the class described in which an internal type gear assembly is utilized in the roll-over mechanism.

The foregoing and other objects and advantages of this invention will appear from the following detailed description, taken in connection with the accompanying drawings of a preferred embodiment.

BRIEF DESCRIPTION OF THE DRAWINGS

FIG. 1 is a plan view of a two-way gang plow frame assembly, with the upper plow bottoms removed for clarity, the assembly being shown in the right hand operative position in full lines and in the left hand operative position in broken lines.

FIG. 2 is a fragmentary section taken on the line 2—2 in FIG. 1 but shown on a slightly larger scale.

FIG. 3 is a fragmentary section taken on the line 3—3 on FIG. 1 but shown on a slightly larger scale.

FIG. 4 is a fragmentary section taken on the line 4—4 in FIG. 3 but shown on a slightly larger scale.

FIG. 5 is a fragmentary section taken on the line 5—5 in FIG. 1 but showing the roll-over assembly in the intermediate or transport position.

DESCRIPTION OF THE PREFERRED EMBODIMENT

Figures 6, 7:
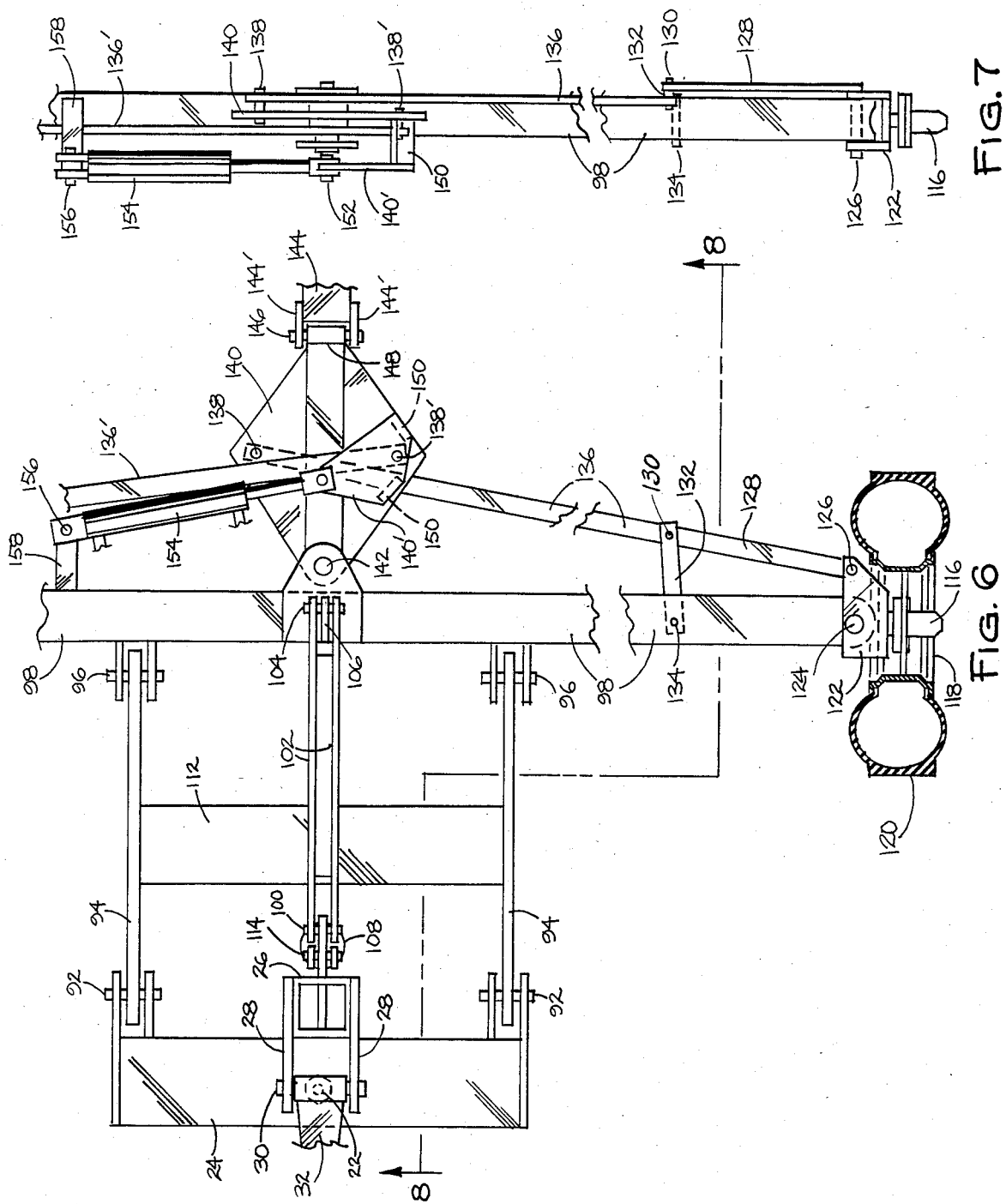
FIG. 6 is a fragmentary, foreshortened plan view of a front support and steering assembly for addition to the right hand end of FIG. 1, the same being shown on a larger scale than FIG. 1.
FIG. 7 is a fragmentary, foreshortened front elevation as viewed from the right in FIG. 6.

Referring primarily to FIGS. 1-4 of the drawings, the plow bottom frame assembly includes a main frame in the form of an elongated tube 10. The forward end of the tube is secured, as by bolts 12, to the top side of structural H-beam 14. The bottom side of this beam is welded to a square tube 16 which, in turn, is welded to a bottom square tube 18. The latter tube is provided with forwardly extending flanges 20 which pivot between them, on central pivot bolt 22, a horizontal pivot beam 24. A vertical post 26 is secured to and extends upward from the center of pivot beam 24 and mounts a pair of rearwardly extending flanges 28. These flanges support a pivot shaft 30 which pivotally mounts the forward end of an alignment lever 32. The rearward end of lever 32 is formed as a round rod 32' which extends freely through an enlarged hole in a flange 34 secured for rotation with but at an oblique angle to a roll-over bearing 36.

Bearing 36 is mounted rotatably on the forward end portion of the main frame tube 10. The forwardmost end portion of the tube 10 extends through a support bracket 38 on the bottom tube 18, and a retainer collar 40 is secured to the forwardmost end of tube 10 to prevent rearward displacement of the tube 10 relative to the associated tubes 16 and 18.

Also secured to the roll-over bearing 36 is an inner segment gear 42 (FIG. 5) which meshes with the internal teeth 44 of a hollow outer segment gear plate or sprocket plate 46. This sprocket plate is secured pivotally, as by pivot shaft 48, between brackets 50 (FIG. 3) projecting upward from tube 18.

Secured to the forward end of tube 16 and to the top side of tube 18 is an elongated fixed cross beam 52. It extends equally to opposite sides of the tubes 16 and 18 and functions to support the forward portion of a plow bottom frame in its alternate operative positions, as described hereinafter. The beam 52 is reinforced by angle braces 52' which extend angularly forward to welded attachment to tube 18 (FIGS. 1 and 3).

The roll-over bearing 36 also mounts the inner end of an elongated roll-over frame beam 54 for rotation therewith. Rotation of the sleeve and beam is afforded by an extensible hydraulic fluid pressure roll-over cylinder 56. As illustrated, the extended end of the piston rod 58 of the cylinder 56 is connected pivotally, by pivot shaft 60, to the outer segment sprocket plate 46. The opposite end of the cylinder is connected pivotally, by pivot shaft 62, to a bracket 62' secured to the fixed cross beam 52 adjacent one end of the latter.

FIG. 5 shows the cylinder 56 in its mid position, as are the meshing gears 42 and 46, with the roll-over beam 54 extending vertically upward, rather than to the side as shown in FIG. 1. This position in FIG. 5 is shown merely for purposes of clarity.

Figure 10:
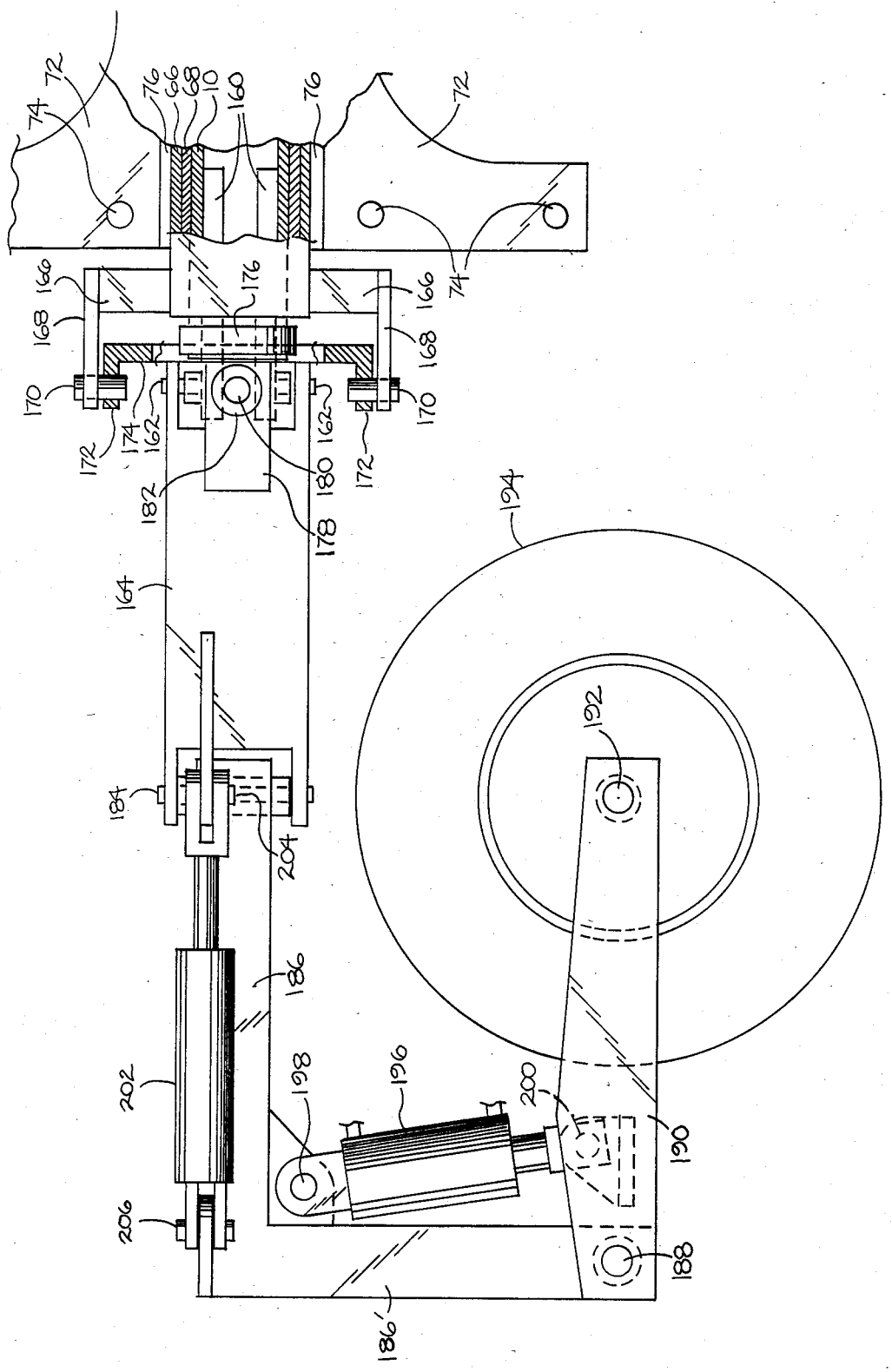
FIG. 10 is a fragmentary side elevation as viewed from the bottom of FIG. 9, parts being broken away to disclose internal structure.
Figure 11:
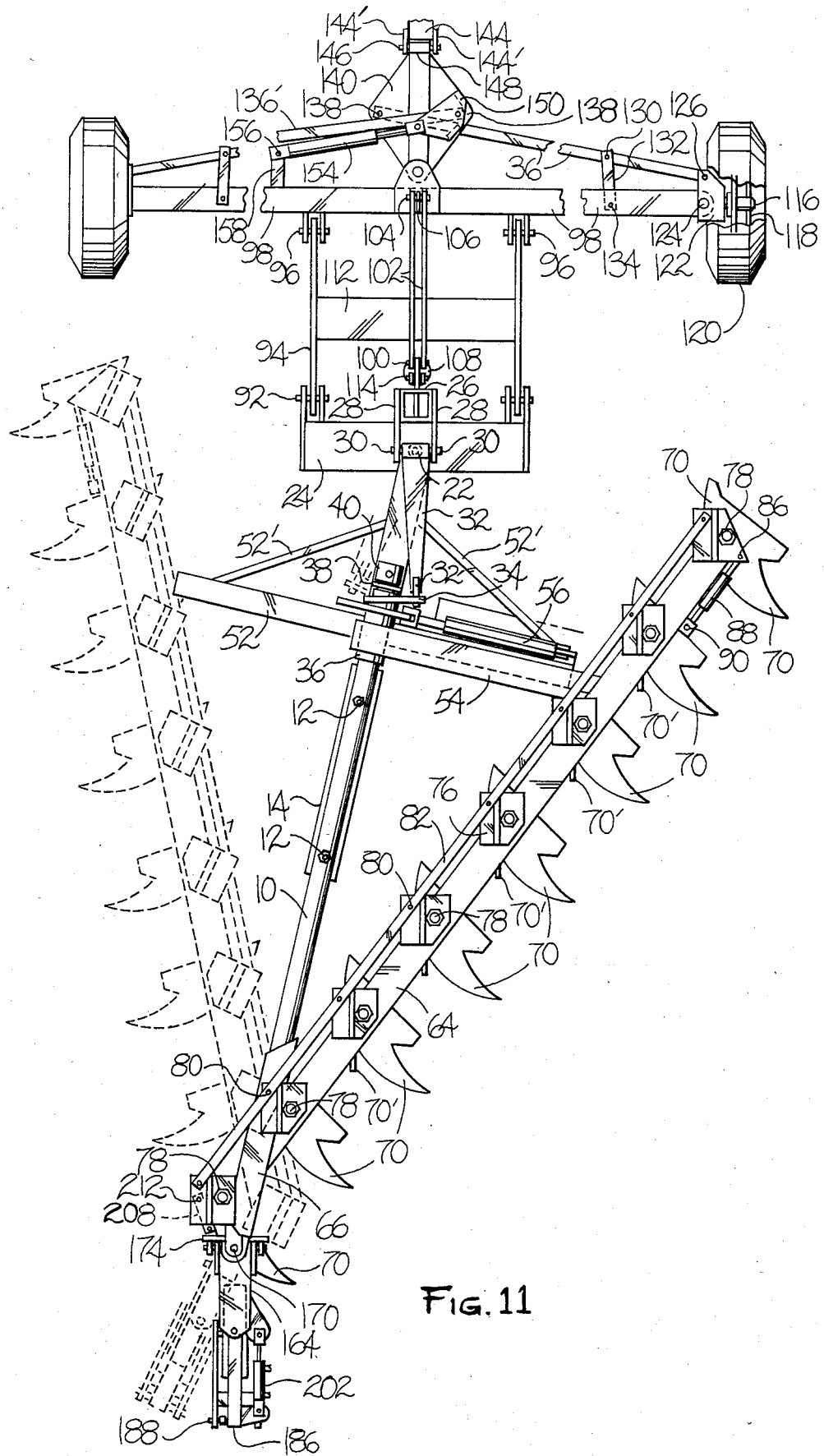
FIG. 11 is a foreshortened, fragmentary plan view of the combined structures shown in FIGS. 1 and 6.

The outer end of the roll-over beam 54 is secured to an elongated plow bottom support beam 64 (FIG. 1) intermediate the ends of the latter. The rearward end of the beam is secured to a sleeve 66 journaled on the rearward end of main frame tube 10 by bearing 68 (FIG. 10).

A plurality of plow bottoms 70 are mounted at longitudinally spaced intervals along the length of support beam 64. In accordance with this invention, they are mounted for adjustment of the lateral spacing between adjacent land sides 70', as the angle of the beam 64 is changed relative to the direction of movement of the plow through the ground to accommodate the plowing of various types and conditions of soils. For example, they may be moved closer together for plowing compacted or otherwise dense soil and farther apart for plowing a wider strip of uncompacted, dry or otherwise light soil. By this means the same tractor may be used with the same gang plow under a variety of conditions.

Figure 9:
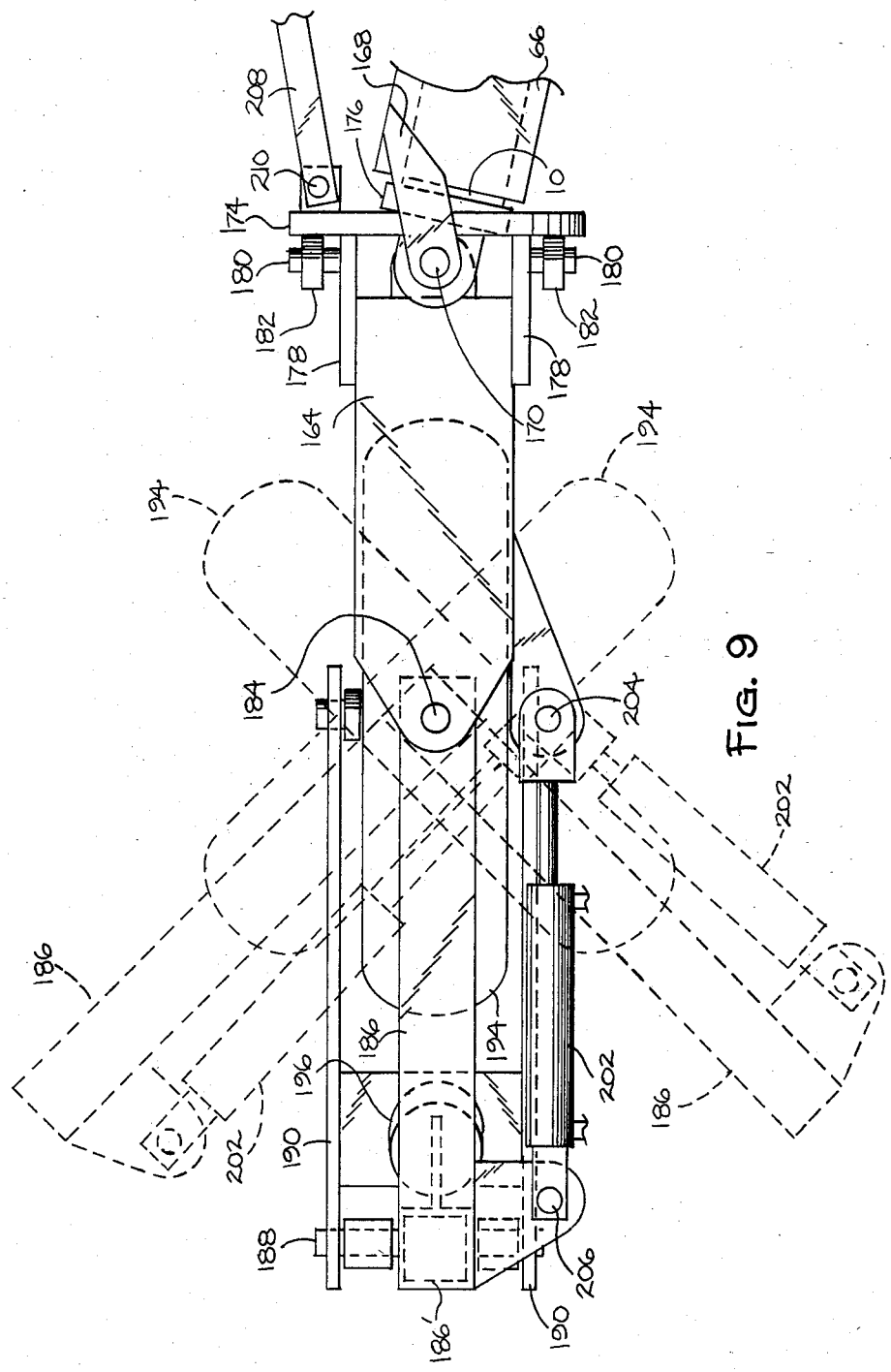
FIG. 9 is a fragmentary plan view of a tail wheel support and steering assembly for addition to the left end of FIG. 1 but shown on a larger scale.

In the embodiment illustrated, the shank 70" (FIG. 2) of each plow bottom is received removably between a pair of mounting flanges 72 and secured detachably as by bolts extended through aligned openings 74 in the flanges and shank. Each pair of flanges projects at right angles from a flange plate 76 which is secured pivotally to the support beam 64 by a pivot bolt 78. Each bolt serves to secure the flange plates 76 of an associated pair of plow bottoms 70 to opposite sides of the beam 64. The rearwardmost pair of flange plates 76 are secured by a pivot bolt 78 to a bracket on sleeve 66, as illustrated in FIGS. 1, 9 and 10.

The flange plates 76 project laterally beyond the beam 64, and all of the upper flange plates are interconnected by pins 80 and tie rod 82 for simultaneous pivotal movement about their pivot bolts 78. Similarly, all of the lower flange plates are interconnected by pins 80 and a tie rod 84. Accordingly, all flange plates are caused to pivot simultaneously and to the same degree.

One of the flange plates 76, the forwardmost one illustrated in FIG. 1, also extends laterally to the side of the support beam 64 opposite the tie rods 82 and 84 and is connected by a pivot pin 86 to one end of a turnbuckle 88. The opposite end of the turnbuckle is connected by a pivot pin 90 to the outer side of plow bottom support beam 64. Accordingly, by adjusting the turnbuckle to shorter or longer length, all of the plow bottoms 70 are pivoted simultaneously about the axis of their respective pivot bolts 78. The land sides 70' of the plow bottoms thus are adjusted angularly relative to the longitudinal axis of the support beam 64, and hence relative to the direction of movement of the plow over the ground. This effectively changes the lateral distance between the land sides of adjacent plow bottoms.

It will be appreciated that the turnbuckle 88 may alternatively be positioned to pivotally interconnect the support beam 64 and the tie rods 82, to perform the same function as described above.

Figure 8:
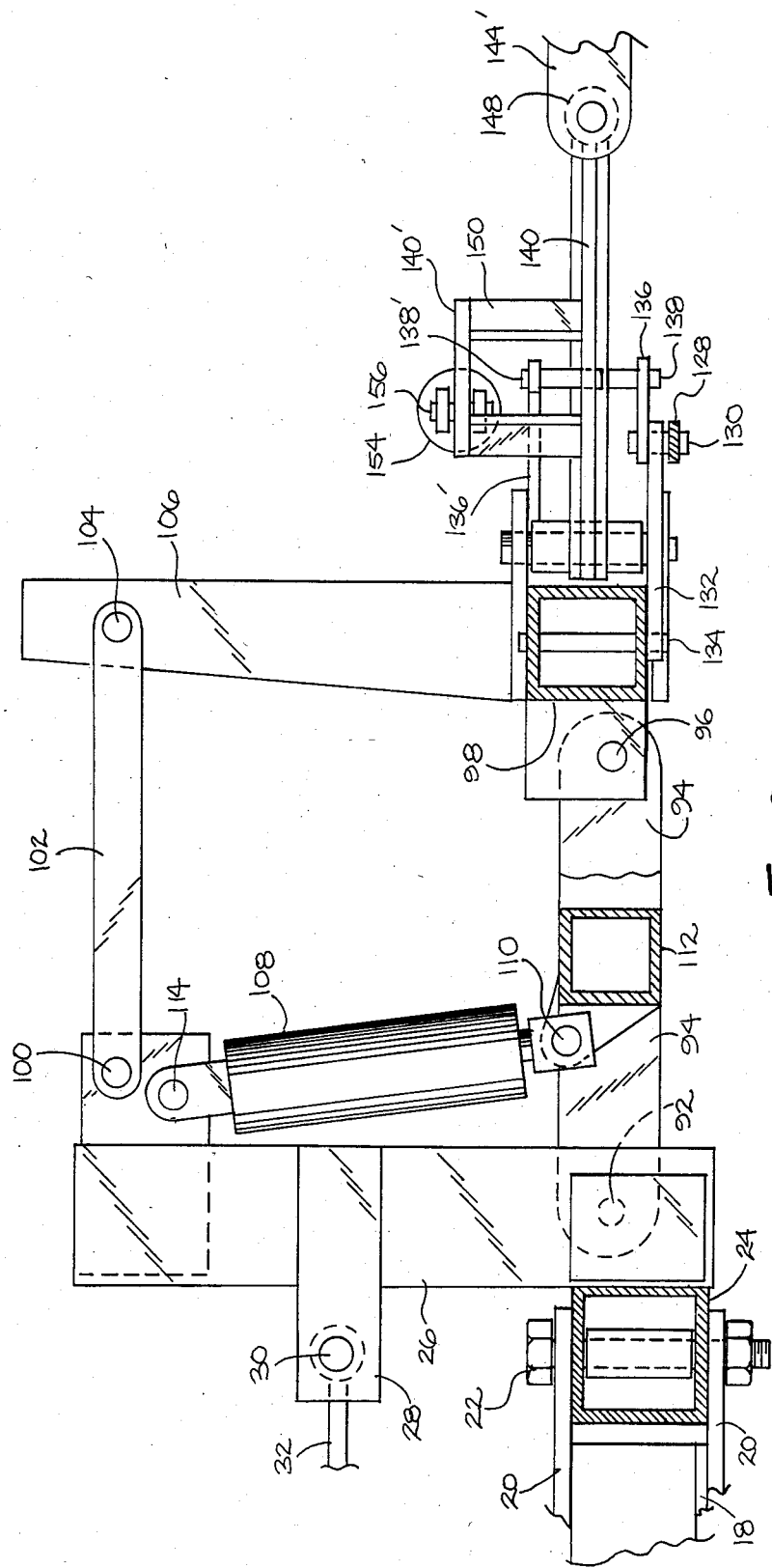
FIG. 8 is a fragmentary section taken on the line 8—8 in FIG. 6 but shown on a larger scale.

Referring now particularly to FIGS. 6 and 8 of the drawings, the front horizontal pivot beam 24 is connected pivotally, adjacent its opposite lateral ends, by pivot shafts 92, to the rearward ends of a pair of bottom elevating links 94. The forward ends of these links are connected pivotally, by pivot shaft 96, to an elongated transverse axle 98. The upper end of the vertical post 26 is connected pivotally, by pivot shaft 100, to the rearward end of top elevating links 102. The forward ends of these links are connected by pivot shaft 104 to the upper end of a vertical beam 106 projecting upwardly from the axle 98, midway between the ends of the latter. An extensible hydraulic elevating cylinder 108 is connected pivotally at its bottom end, by pivot shaft 110, to a beam 112 interconnecting the bottom elevating links 94. The upper end of the cylinder 108 is connected pivotally, by pivot shaft 114, to the upper end of the vertical post 26.

A hub 116 at each end of the axle 98 serves to removably mount a wheel 118 which, in turn, mounts a tire 120. Each hub is supported by a steering link 122 secured to the axle by a pivot shaft 124. This link 122 is, in turn, connected by a pivot pin 126 to the outer end of a link 128. The inner end of link 128 is connected by pivot pin 130 to the forward end of a support arm 132 which is connected at its rearward end by pivot pin 134 to the axle 98.

Also connected to pivot pin 130 is the outer end of link 136. The inner end of this link is connected by a pivot pin 138 to a base steering plate 140 connected pivotally to the axle 98 by pivot shaft 142. Since FIG. 6 shows only the complete linkage assembly for the right front wheel, the corresponding link for the left wheel is distinguished by the prime superscript, thus 136'. In this regard, it is to be noted from FIG. 7 that link 136 extends under the plate 140 and that its connecting pivot pin 138 is located on the plate 140 to the far side of its longitudinal center line. Conversely, the link 136' for the left front wheel extends over the plate 140 and is connected to a pivot pin 138' extending upward from plate 140.

The forward end of the main steering plate 140 is connected to the rearward end of a towing tongue 144, as by means of a horizontal pivot shaft 146 extending through aligned openings in a bearing 148 on the plate 140 and flanges 144' on the tongue. The opposite, front end of the tongue is arranged for pivotal attachment to a towing tractor, as will be understood.

A raised sub-plate 140' is supported by and spaced above the main plate 140 by spacers 150. Connected to this sub-plate, by a pivot shaft 152, is the inner end of a laterally extending extensible hydraulic master steering cylinder 154. The outer end of the cylinder is connected by a pivot shaft 156 to a bracket 158 on the axle 98. The master cylinder 154 is connected by hydraulic lines to an extensible hydraulic slave cylinder associated with a steerable tail wheel assembly now to be described.

With particular reference to FIGS. 9 and 10 of the drawings, the rear end of the main frame tube 10 mounts a pair of flanges 160 which is welded to the inner surface of the tube 10 and extends rearwardly therefrom to support a vertical pivot shaft 162. This pivot shaft pivotally interconnects the forwardly projecting flanges of a rear steering link 164. Secured to the rear plow bottom support beam sleeve 66 are diametrically outwardly extending brackets 166 each mounting a rearwardly extending arm 168. Each arm supports a pivot shaft 170. These shafts are aligned on a common axis with pivot shaft 162 and extend through diametrically opposed flanges 172 projecting rearwardly from an annular alignment ring 174. The central opening in the ring 174 accommodates the flanges 160, the rear end of main frame tube 10 and the retainer collar 176. The collar is secured to the tube 10 to prevent rearward displacement of the sleeve 66.

The link 164 also mounts a pair of flanges 178 which extend forwardly therefrom at 90 degrees displacement from the flanges 160 suporting the pivot shaft 162. The flanges 178 mount shafts 180 for rollers 182 which bear against the confronting surface of the alignment ring 174.

The rearward end of link 164 also is provided with rearwardly extending flanges which receive a pivot shaft 184 between them. Mounted pivotally on the shaft 184 is the forward end of the horizontal section 186 of a steering arm. The vertical section 186' of the steering arm extends downwardly from the horizontal section and mounts at its lower end, by pivot shaft 188, the rearward end of elevating links 190. The forward end of links 190 mounts the axle 192 of tail wheel 194.

An extensible hydraulic elevating cylinder 196 is connected pivotally, by pivot shaft 198, to the junction between arm sections 186 and 186', and by pivot shaft 200 to the elevating links 190. Extension of cylinder 196 causes links 190 to rotate clockwise (FIG. 10) about their pivot shaft 188 and raise the rear end of the plow assembly, as will be understood.

As previously mentioned, an extensible hydraulic slave cylinder 202 is connected by hydraulic lines to the master cylinder 154. The slave cylinder is disposed parallel to the horizontal section 186 of the steering arm and is connected pivotally at its forward end, by pivot shaft 204, to the link 164 and its rearward end by pivot shaft 206 to the horizontal arm section 186.

The hydraulic connection between the master cylinder 154 and slave cylinder 202 are made so that extension of the master cylinder effects contraction of the slave cylinder, and vice-versa. Thus, for example, referring to FIGS. 6 and 9, a right hand turn of the towing tractor causes main steering plate 140 to rotate clockwise about its pivot shaft 142 and turn the front wheels 118 to the right. This clockwise rotation of plate 140 effects extension of master cylinder 154 and simultaneously effects contraction of slave cylinder 202 (FIG. 9). The horizontal section of steering arm 186 thus is rotated counterclockwise about its pivot shaft 184, thereby turning the tail wheel 194 to the left.

It is to be noted from FIG. 6 that when the main steering plate 140 is rotated to turn the front wheels in a desired direction, the crossed pivot connections 138 and 138' for the links 136 and 136' function by being located at equal distances from pivot 142 and equal distances to opposite sides of the longitudinal centerline of the plate 140, to cause the wheel 118 on the inside of the turn to pivot to a greater degree than the wheel on the outside of the turn.

There is also provided a link 208 pivotally interconnecting the alignment ring 174 and one of the rearmost pair of flange plates 76, as by pivot pins 210 and 212, respectively, (FIG. 1). This link functions to adjust the angular disposition of the rear tail wheel link 164 relative to the frame tube 10 during angular adjustment of the plow bottoms 70, as explained more fully hereinafter.

In the operation of the plow assembly described, let it be assumed that the tongue 144 is connected to a towing tractor and the plow bottom assembly is in the right hand operating position shown in full lines in FIG. 1. Let it also be assumed that the elevating cylinders 108 and 196 are in the contracted, operating positions of FIGS. 8 and 10 to position the plow bottoms 70 for desired penetration of the ground.

Let it now be assumed that it is desired to roll the plow bottom assembly from the full line right hand position of FIG. 1 to the broken line left hand position, i.e. with the plow bottom assembly swung to an angular position to the left of the main frame tube 10. This is accomplished by first raising the plow bottoms out of the ground, by extending the elevating cylinders 108 and 196, and then supplying hydraulic fluid under pressure to the roll-over cylinder 56 to extend the latter from its condition in FIG. 1. This causes the outer gear plate 46, and hence also the inner gear 42, to rotate clockwise (FIG. 5), thereby rotating the roll-over beam 54 and plow bottom frame assembly about the common axis of the bearings 36 and 68. By extending the cylinder 56 fully, the plow bottom assembly is rotated from the right hand operative position of FIG. 1 through the intermediate, transport position of FIG. 5 to the left hand operative position desired.

During the foregoing rotation of the plow bottom assembly, simultaneous rotation of the interconnected bearing 36, beam 54 and flange 34, causes clockwise rotation of the alignment lever 32 and hence the horizontal pivot beam 24 about its pivot 22 (FIG. 1). The direction of movement of the plow by its pulling tractor thus is changed from the dash line 214 to dash line 216, as the tractor moves forward over the ground.

Also, simultaneous rotation of sleeve 66 causes corresponding rotation of alignment ring 174 and clockwise rotation of tail wheel steering link 164 (FIG. 9) about the axis of its pivot shafts 162, as the rollers 182 roll on the rotating alignment ring 174. The front wheel axle 98 and the rear wheel axle 192 thus are adjusted automatically to the desired angles relative to the longitudinal axis of the main frame tube 10 for operating the plow bottom 70 in the left hand position. The elevating cylinders 108 and 196 then are contracted to lower the plow bottoms to operating level.

Let it now be assumed that the plow assembly once again is in the full line, right hand operating position of FIG. 1 and it is desired to shorten the distance between adjacent plow bottoms 70, because of compacted soil to be plowed. By shortening the length of the turnbuckle 88, the flange plates 76 are rotated clockwise about their pivot bolts 78 in FIG. 1. Simultaneously the pull on link 208 causes the alignment ring 174 to be rotated clockwise about the common axis of pivot 170. The tail wheel link 164 thus is rotated clockwise about the axis of pivot shafts 162, thereby swinging the tail wheel closer to alignment with the main frame 10. The latter thereupon is caused to move more in line with the direction of movement of the plow as it is towed over the ground. Accordingly, the land sides 70' of the plow bottoms 70 are disposed closer together.

When it is desired to transport the plow to another site, the elevating cylinders 108 and 196 are extended, as previously explained, to raise the plow bottoms above ground. The roll-over cylinder 56 then is operated to bring the roll-over beam 54 to the vertically extending position of FIG. 5. The shanks 70" of the pairs of plow bottoms 70 thus extend horizontally and laterally outward to opposite sides of the roll-over beam 54, with all plow bottoms elevated well above the ground, for convenient transport of the assembly by the towing tractor.

It will be apparent to those skilled in the art that various changes may be made in the size, type, number and arrangement of parts described hereinbefore. For example, in the event it is not desired to have the plow bottoms 70 adjustable, they may be secured against rotation relative to the beam 54. In this instance, the ring 174 will be secured rigidly to the sleeve 66 so that the ring will function to adjust the angle of the tail wheel 194 relative to the land sides of the plow bottoms during roll-over of the plow bottom assembly. These and other changes and modifications may be made without departing from the spirit of this invention and the scope of the appended claims.

Having thus described my invention and the manner in which it may be used, I claim:

1. A two-way gang plow comprising:
   (a) an elongated main frame,
   (b) an elongated plow bottom support frame supported adjacent its rear end by the main frame adjacent the rear end of the latter for rotation about the longitudinal axis of the main frame, the plow bottom support frame extending forwardly from said rear end support at an acute included angle relative to the main frame,
   (c) a plurality of pairs of plow bottoms mounted on the plow bottom support frame, each plow bottom having a land side,
   (d) a roll-over frame member secured at one end to the plow bottom support frame and supported adjacent its opposite end for rotation about the longitudinal axis of the main frame adjacent the front end of the latter,
   (e) and elongated front axle secured pivotally to the front end of the main frame midway between its ends and extending transversely of the main frame for pivotal movement about a vertical axis,
   (f) front steerable support wheels mounted on the opposite ends of the front axle for pivotal steering movement about vertical axes,
   (g) steering plate means connected at its rear end to the front axle midway between the ends thereof for pivotal movement about a vertical axis and arranged at its front end for connection to a towing tractor,
   (h) linkage means interconnecting the steering plate means and each front support wheel for moving the support wheels in steering directions by pivotal movement of the steering plate means,
   (i) an hydraulic master cylinder pivotally interconecting the steering plate means and the front axle for extension and retraction as the steering plate means is pivoted,
   (j) a tail wheel support member operatively connected pivotally at its forward end to the rear end of the main frame for pivotal movement about a vertical axis, and
   (k) an hydraulic slave cylinder pivotally interconnecting the tail wheel support member and the main frame, the slave cylinder and master cylinder being coupled together for movement of one of said cylinders in response to movement of the other cylinder for pivotally rotating the front steering wheels and tail wheel in opposite steering directions.

2. A two-way gang plow comprising:
   (a) an elongated main frame,
   (b) an elongated plow bottom support frame supported adjacent its rear end by the main frame adjacent the rear end of the latter for rotation about the longitudinal axis of the main frame, the plow bottom support frame extending forwardly from said rear end support at an acute inclined angle relative to the main frame,
   (c) a plurality of pairs of plow bottoms mounted on the plow bottom support frame, each plow bottom having a land side,
   (d) a roll-over frame member secured at one end to the plow bottom support frame and supported adjacent its opposite end for rotation about the longitudinal axis of the main frame adjacent the front end of the latter,
   (e) an elongated front axle secured pivotally to the front end of the main frame midway between its ends and extending transversely of the main frame for pivotal movement about a vertical axis,
   (f) front steerable support wheels mounted on the opposite ends of the front axle for pivotal steering movement about vertical axes, and
   (g) an alignment lever connected operatively at its forward end to the front axle and operatively engaging the roll-over frame member at its rearward end for rotating the front axle about its pivot connection to the main frame during roll-over rotation of the roll-over frame member.

3. The two-way gang plow of claim 2 including:
   (a) bearing means mounted rotatably on the main frame adjacent the front and rear ends thereof for supporting the respective roll-over frame member and the rear end of the plow bottom support frame for rotation about the axis of the main frame, and
   (b) an alignment flange secured to the front bearing means and engaging the alignment lever for moving the latter and rotating the front axle.

4. The two-way gang plow of claim 2 including:
   (a) a tail wheel link member forming a part of the main frame and pivotally connected at its front end to the rear end of said elongated main frame for pivotal movement about a vertical axis,
   (b) a tail wheel support member connected pivotally at its forward end to the rear end of the tail wheel link member for pivotal movement about a vertical axis, (c) an alignment ring member secured pivotally to the rear end of the plow bottom support frame for rotation therewith, and (d) a plurality of roller members mounted on the tail wheel link member and engaging the alignment ring member in rolling contact therewith, whereby to adjust the angular disposition of the tail wheel link member relative to the plow bottom support frame simultaneously during roll-over rotation of the said support frame.

5. A two-way gang plow comprising:

(a) an elongated main frame, (b) an elongated plow bottom support frame supported adjacent its rear end by the main frame adjacent the rear end of the latter for rotation about the longitudinal axis of the main frame, the plow bottom support frame extending forwardly from said rear end support at an acute included angle relative to the main frame, (c) a plurality of pairs of plow bottoms mounted on the plow bottom support frame, each plow bottom having a land side, (d) a roll-over frame member secured at one end to the plow bottom support frame and supported adjacent its opposite end for rotation about the longitudinal axis of the main frame adjacent the front end of the latter, (e) a tail wheel link member forming a part of the main frame and pivotally connected at its front end to the rear end of said elongated main frame for pivotal movement about a vertical axis, (f) a tail wheel support member connected pivotally at its forward end to the rear end of the tail wheel link member for pivotal movement about a vertical axis, (g) an alignment ring member secured to the rear end of the plow bottom support frame for rotation therewith, and (h) a plurality of roller members mounted on the tail wheel link member and engaging the alignment ring member in rolling contact therewith, whereby to adjust the angular disposition of the tail wheel link member relative to the plow bottom support frame simultaneously during roll-over rotation of the said support frame.

6. A two-way gang plow comprising:

(a) an elongated main frame, (b) an elongated plow bottom support frame supported adjacent its rear end by the main frame adjacent the rear end of the latter for rotation about the longitudinal axis of the main frame, the plow bottom support frame extending forwardly from said rear end support at an acute included angle relative to the main frame, (c) a plurality of pairs of plow bottoms mounted on the plow bottom support frame, each plow bottom having a land side, (d) a roll-over frame member secured at one end to the plow bottom support frame and supported adjacent its opposite end for rotation about the longitudinal axis of the main frame adjacent the front end of the latter, (e) a plow bottom attachment member mounting each plow bottom and secured to the plow bottom support frame for pivotal movement about an axis extending parallel to the plane of the land side of the plow bottom, (f) a tie rod member pivotally interconnecting all said plow bottom attachment members for pivoting all said attachment members simultaneously and to the same degree, (g) adjustment means pivotally interconnecting the tie rod member and plow bottom support frame for moving the tie rod member and pivoting said plow bottom attachment members to vary the angle of the land sides of the plow bottoms relative to the longitudinal axis of the plow bottom support frame, (h) a tail wheel link member forming a part of the main frame and pivotally connected at its front end to the rear end of said elongated main frame for pivotal movement about a vertical axis, (i) a tail wheel support member connected pivotally at its forward end to the rear end of the tail wheel link member for pivotal movement about a vertical axis, and (j) connector means interconnecting the rearmost plow bottom support member and the tail wheel link member for moving the latter about the axis of its vertical pivot connection to the main frame simultaneously with pivotal adjustment of the plow bottom support members, the connector means including an alignment ring member secured pivotally to the rear end of the plow bottom support frame for rotation therewith, a plurality of roller members mounted on the tail wheel link member and engaging the alignment ring member in rolling contact therewith, and a connector link pivotally interconnecting the alignment ring member and the rearmost plow bottom support member, whereby to adjust the angular disposition of the tail wheel link member relative to the plow bottom support frame simultaneously during roll-over rotation of the said support frame.

7. A two-way gang plow comprising:

(a) an elongated main frame, (b) an elongated plow bottom support frame supported adjacent its rear end by the main frame adjacent the rear end of the latter for rotation about the longitudinal axis of the main frame, the plow bottom support frame extending forwardly from said rear end support at an acute included angle relative to the main frame, (c) a plurality of pairs of plow bottoms mounted on the plow bottom support frame, each plow bottom having a land side, (d) a roll-over frame member secured at one end to the plow bottom support frame and supported adjacent it opposite end for rotation about the longitudinal axis of the main frame adjacent the front end of the latter, (e) and elongated front axle secured pivotally to the front end of the main frame midway between its ends and extending transversely of the main frame for pivotal movement about a vertical axis, (f) front steerable support wheels mounted on the opposite ends of the front axle for pivotal steering movement about vertical axes, (g) a transverse pivot beam mounted on the forward end of said elongated main frame for pivotal movement about a vertical axis, (h) a forward plow elevating section interconnecting the transverse pivot beam and the front axle for pivotal movement about transverse horizontal axes, and (i) extensible power means pivotally interconnecting the forward plow elevating section and the transverse pivot beam.

8. A two-way gang plow comprising:

(a) an elongated main frame, (b) an elongated plow bottom support frame supported adjacent its rear end by the main frame adjacent the rear end of the latter for rotation about the longitudinal axis of the main frame, the plow bottom support frame extending forwardly from said rear end support at an acute included angle relative to the main frame, (c) a plurality of pairs of plow bottoms mounted on the plow bottom support frame, each plow bottom having a land side, (d) a roll-over frame member secured at one end to the plow bottom support frame and supported adjacent its opposite end for rotation about the longitudinal axis of the main frame adjacent the front end of the latter, (e) an elongated front axle secured pivotally to the front end of the main frame midway between its ends and extending transversely of the main frame for pivotal movement about a vertical axis, (f) front steerable support wheels mounted on the opposite ends of the front axle for pivotal steering movement about vertical axes, (g) steering plate means connected at its rear end to the front axle midway between the ends thereof for pivotal movement about a vertical axis and arranged at its front end for connection to a towing tractor, (h) linkage means interconnecting the steering plate means and each front support wheel for moving the support wheels in steering directions by pivotal movement of the steering plate means, (i) an hydraulic master cylinder pivotally interconnecting the steering plate means and the front axle for extension and retraction as the steering plate means is pivoted, (j) a tail wheel link member forming a part of the main frame and pivotally connected at its front end to the rear end of said elongated main frame for pivotal movement about a vertical axis, (k) a tail wheel support member connected pivotally at its forward end to the rear end of the tail link member for pivotal member about a vertical axis, (l) an hydraulic slave cylinder pivotally interconnecting the tail wheel support member and the main frame, the slave cylinder and master cylinder being coupled together for movement of one of said cylinders in response to movement of of the other cylinder for pivotally rotating the front steering wheels and the tail wheel in opposite steering directions, (m) power means interconnecting the main frame and the roll-over frame member for rotating the latter and plow bottom support frame between right and left hand operating positions relative to the longitudinal axis of the main frame, the power means comprising:

(1) an outer segment gear plate having an interior opening defining an outer segment gear, (2) an inner segment gear secured to the roll-over frame member and received in the interior opening of the outer segment gear plate and meshing with the outer segment gear, (3) pivot means securing the outer segment gear plate to the main frame, and (4) an hydraulic cylinder pivotally interconnecting the main frame and the outer segment gear plate for pivoting the latter and rotating the inner segment gear to rotate the roll-over frame member, (n) an alignment lever connected operatively at its forward end to the front axle and operatively engaging the roll-over frame member at its rearward end for rotating the front axle about its pivot connection to the main frame during roll-over rotation of the roll-over frame member, (o) bearing means mounted rotatably on the main frame adjacent the front and rear ends thereof for supporting the respective roll-over frame member and the rear end of the plow bottom support frame for rotation about the axis of the main frame, (p) an alignment flange secured to the front bearing means and engaging the alignment lever for moving the latter and rotating the front axle, (q) a transverse pivot beam mounted on the forward end of the said elongated main frame for pivotal movement about a vertical axis, (r) a forward plow elevating section interconnecting the transverse pivot beam and the front axle for pivotal movement about transverse horizontal axes, (s) extensible power means pivotally interconnecting the forward plow elevating section and the transverse pivot beam, (t) a plow bottom attachment member mounting each plow bottom and secured to the plow bottom support frame for pivotal movement about an axis extending parallel to the plane of the land side of the plow bottom, (u) a tie rod member pivotally interconnecting all of the plow bottom attachment members for pivoting all said attachment members simultaneously and to the same degree, (v) adjustment means pivotally interconnecting the tie rod member and plow bottom support frame for moving the tie rod member and pivoting said plow bottom attachment members to vary the angle of the land sides of the plow bottoms relative to the longitudinal axis of the plow bottom support frame, and (w) connector means interconnecting the rearmost plow bottom support member and the tail wheel link member for moving the latter about the axis of its vertical pivot connection to the main frame simultaneously with pivotal adjustment of the plow bottom support members, (x) the connector means including an alignment ring member secured pivotally to the rear end of the plow bottom support frame for rotation therewith, a plurality of roller members mounted on the tail wheel link member and engaging the alignment ring member in rolling contact therewith, and a connector link pivotally interconnecting the alignment ring member and the rearmost plow bottom support member, whereby to adjust the angular disposition of the tail wheel link member relative to the plow bottom support frame simultaneously during roll-over rotation of the said support frame.

* * * * *